United States Patent [19]
Murphy

[11] Patent Number: 5,922,368
[45] Date of Patent: Jul. 13, 1999

[54] INJECTION MOLDING APPARATUS FOR MOLDING THERMOPLASTIC AIR BAG COVERS

[75] Inventor: John F. Murphy, Imlay City, Mich.

[73] Assignee: Larry J. Winget, Leonard, Mich.

[21] Appl. No.: 08/842,493

[22] Filed: Apr. 24, 1997

[51] Int. Cl.⁶ .................................................. B29C 45/44
[52] U.S. Cl. .......................... 425/552; 264/318; 425/556; 425/577; 425/DIG. 58
[58] Field of Search .................................... 425/556, 547, 425/552, DIG. 58, 577; 264/318

[56] References Cited

U.S. PATENT DOCUMENTS

| | | |
|---|---|---|
| 5,062,661 | 11/1991 | Winget . |
| 5,183,615 | 2/1993 | Zushi . |
| 5,403,179 | 4/1995 | Ramsey ............................ 425/DIG. 58 |
| 5,465,998 | 11/1995 | Davis . |
| 5,487,557 | 1/1996 | Eckhout . |
| 5,498,026 | 3/1996 | Eckhout . |
| 5,501,485 | 3/1996 | Eckhout . |
| 5,520,412 | 5/1996 | Davis . |
| 5,542,694 | 8/1996 | Davis . |
| 5,549,323 | 8/1996 | Davis . |
| 5,558,364 | 9/1996 | Davis . |
| 5,603,968 | 2/1997 | Tajiri et al. ....................... 425/DIG. 58 |

*Primary Examiner*—Tim Heitbrink
*Attorney, Agent, or Firm*—Brooks & Kushman P.C.

[57] ABSTRACT

An improved injection molding apparatus for molding snap-on, thermoplastic air bag covers is provided including a plurality of wedge-shaped outboard mold parts slidably mounted on bearing surfaces of a plurality of gibs which are removably mounted to a central wedge all nested together within a central recess in the lower mold half in retracted positions of the outboard mold parts. Each of the outboard mold parts has a clip member-defining surface for forming front and rear sections and a snap-on groove of its corresponding clip member of the air bag cover. Each outboard mold part is in sliding contact with its respective gib during its entire sliding movement between its retracted and fully extended positions.

10 Claims, 4 Drawing Sheets

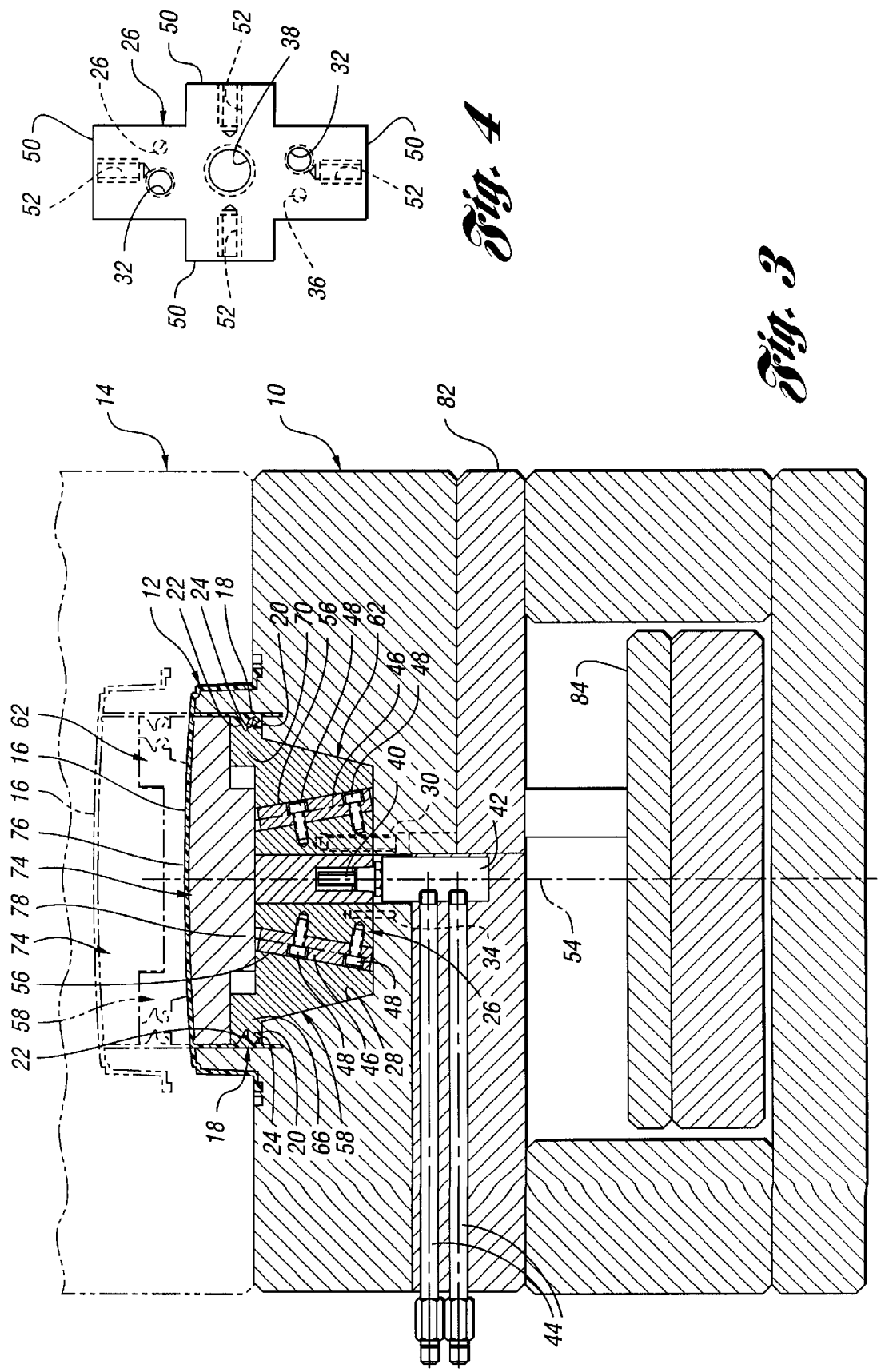

INJECTION MOLDING APPARATUS FOR MOLDING THERMOPLASTIC AIR BAG COVERS

TECHNICAL FIELD

This invention relates to injection molding apparatus and, in particular, to injection molding apparatus for molding thermoplastic air bag covers.

BACKGROUND ART

Thermoplastic air bag covers are now widely used. Examples of such air bag covers can be found in the following U.S. Pat. Nos.: 5,062,661; 5,487,557; 5,465,998; 5,549,323; 5,558,364; 5,498,026; 5,520,412; 5,542,694; and 5,501,485. Snap-on air bag covers are shown in the following U.S. Pat. Nos. from the above list: 5,465,998; 5,498,026; and 5,501,485.

Injection molding apparatus for forming such air bag covers typically have a first mold half having a first molding surface to form a first part of an air bag cover-defining cavity and a second mold half having a second molding surface to form a second complementary part of the air bag cover-defining cavity. The first and second molding surfaces form the air bag cover including a front cover panel and separate resilient clip members integrally formed with the front cover panel. Each of the clip members typically has a front engagement section, a rear shoulder section, and a snap-on groove extending therebetween for snapping the air bag cover onto a retaining member of an air bag assembly.

Typically, the mold parts which form the resilient clip members of the air bag cover are formed to facilitate removal of the air bag cover upon completion of a molding cycle. An operator grabs the molded air bag cover and snaps it off the mold parts forming the clip members. Such manual removal of the air bag cover from the injection molding apparatus is undesirable for many reasons.

U.S. Pat. No. 5,603,968 discloses molding apparatus including a plurality of core members which are movable between retracted and extended positions with respect to one of the movable and fixed mold halves. The core members define a molding cavity along with the movable and fixed mold halves when the core members are in their retracted position.

The core members include a first core member for forming a first projection of the pad which is movable along a predetermined moving path. At least one relatively thin second core member and at least one third core member are also provided. The at least one third core member forms a second projection of the pad. By selectively extending and retracting the core members, the steering wheel pad can be separated from the mold apparatus without requiring an operator to exert manual force therefor.

However, a need still exists for robust injection molding apparatus for molding thermoplastic air bag covers on a production basis.

SUMMARY OF THE INVENTION

An object of the present invention is to provide a robust injection molding apparatus including a plurality of outboard mold parts for molding thermoplastic air bag covers wherein each outboard mold part forms a clip member of the air bag cover including its front and rear sections and snap-on groove therebetween.

Another object of the present invention is to provide a robust injection molding apparatus for molding thermoplastic air bag covers wherein the injection molding apparatus can be used on a production basis to accurately and repeatedly make snap-on air bag covers on a consistent basis.

In carrying out the above objects and other objects of the present invention, an improved injection molding apparatus for molding thermoplastic air bag covers is provided. The apparatus includes a first mold half having a first molding surface to form a first part of an air bag cover-defining cavity and a second mold half having a second molding surface to form a second complementary part of the air bag cover-defining cavity. The first and second molding surfaces form an air bag cover including a front cover panel and separate resilient clip members integrally formed with the front cover panel. Each of the clip members has a front section, a rear section and a snap-on groove extending therebetween for snapping the air bag cover onto a retaining member of an air bag assembly. The second mold half includes a plurality of bearing members arranged about a central axis of the second mold half. Each of the bearing members has a bearing surface inclined towards the central axis at a predetermined angle. Outboard mold parts are slidably mounted on the bearing surfaces about the central axis for sliding movement relative thereto between retracted positions and fully extended positions. Each of the outboard mold parts has a clip member-defining surface for forming the front and rear sections and the snap-on groove of its corresponding clip member. A means or mechanism is provided for slidably moving the outboard mold parts axially and radially inwardly toward the central axis from their retracted positions to their fully extended positions to snap each of the clip members off its corresponding outboard mold part.

Preferably, the improved injection molding apparatus includes a central wedge positioned along the central axis. The bearing members preferably comprise gibs removably mounted on the central wedge at peripherally spaced positions thereon. Each outboard mold part is in sliding contact with its respective gib to allow movement between its retracted and fully extended positions.

Also, preferably, the second mold half includes a central mold part positioned along the central axis and having a front cover panel-defining surface for forming the front cover panel and a means or mechanism for axially moving the central mold part in unison with movement of the outboard mold parts. The outboard mold parts move radially inwardly toward the central axis.

Still, preferably, one of the sections of the clip members is hook-shaped.

Also, preferably, the means or mechanism for moving the outboard mold parts and the central mold part include rods. Each of the rods is coupled to a respective one of the mold parts.

The central mold part includes a center portion disposed between the outboard mold parts. The outboard mold parts move radially inwardly toward the center portion during movement from the retracted positions toward the fully extended positions of the outboard mold parts.

Preferably, there are four bearing members and four outboard mold parts arranged about the central axis to form four clip members.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a sectional, broken away view taken along the lines 3—3 in FIG. 1 with a first or upper mold half of the injection molding apparatus illustrated in phantom and with the snapped-off air bag cover also illustrated in phantom;

FIG. 4 is a bottom view of a central wedge of the injection molding apparatus of the present invention;

BEST MODE FOR CARRYING OUT THE INVENTION

Figure 1:
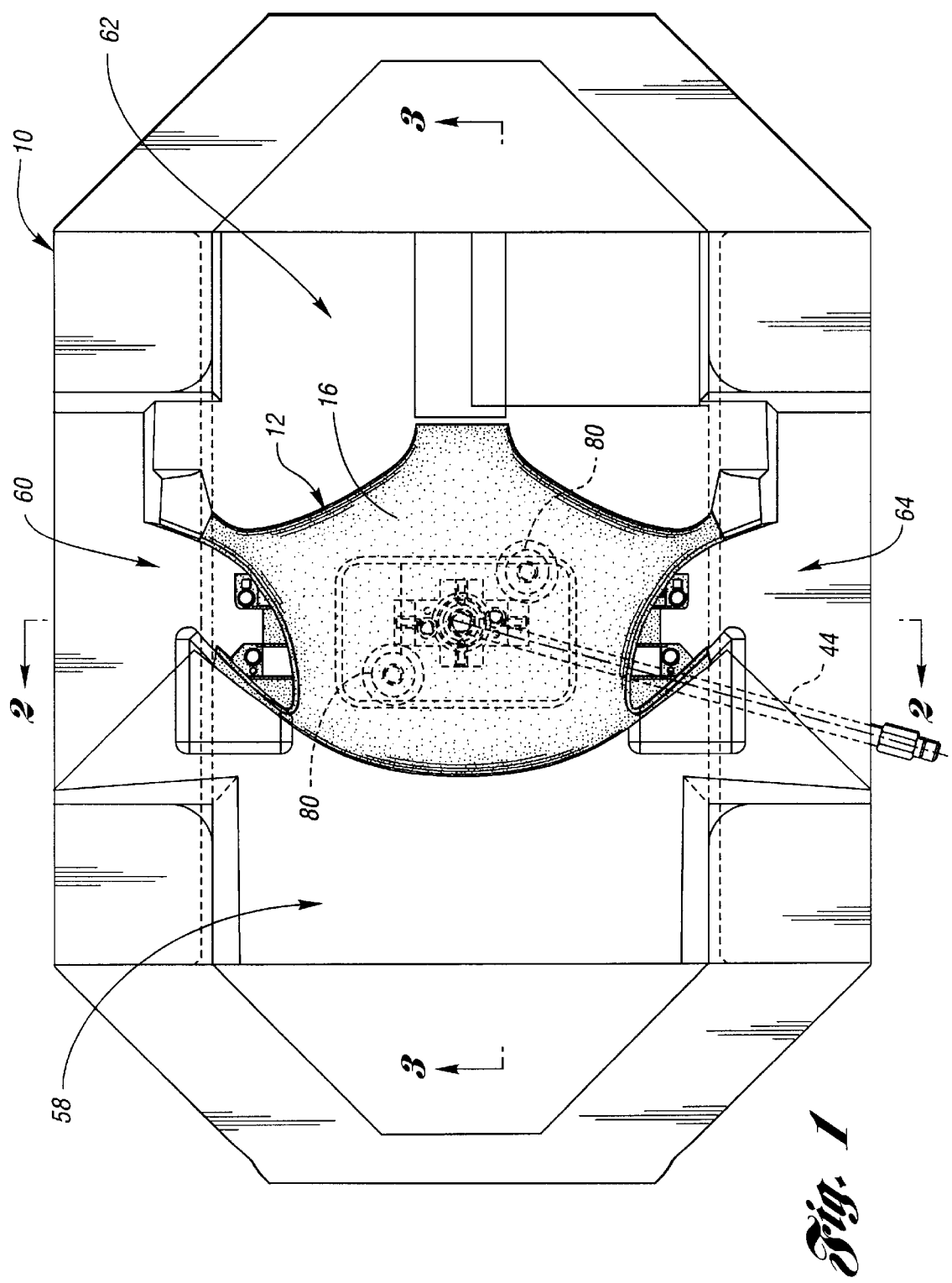
FIG. 1 is a top plan view of a molded thermoplastic air bag cover positioned on a lower mold half of an injection molding apparatus of the present invention.

Referring now to the drawing Figures, there is illustrated in FIG. 1 a top plan view of a lower mold half, generally indicated at 10, of an injection molding apparatus constructed in accordance with the present invention. The injection molding apparatus is provided for molding thermoplastic air bag covers such as a thermoplastic air bag cover, generally indicated at 12, which is also illustrated in detail in FIGS. 5 and 6 (i.e. rear and front elevational views thereof).

The injection molding apparatus of the present invention includes a first mold half, as indicated in phantom at 14 in FIG. 3, which has a first molding surface to form a first part of an air bag cover-defining cavity. The lower or second mold half 10 of the injection molding apparatus has a second molding surface which forms a second complementary part of the air bag cover-defining cavity. The first and second molding surfaces form the air bag cover 12.

Figure 2:
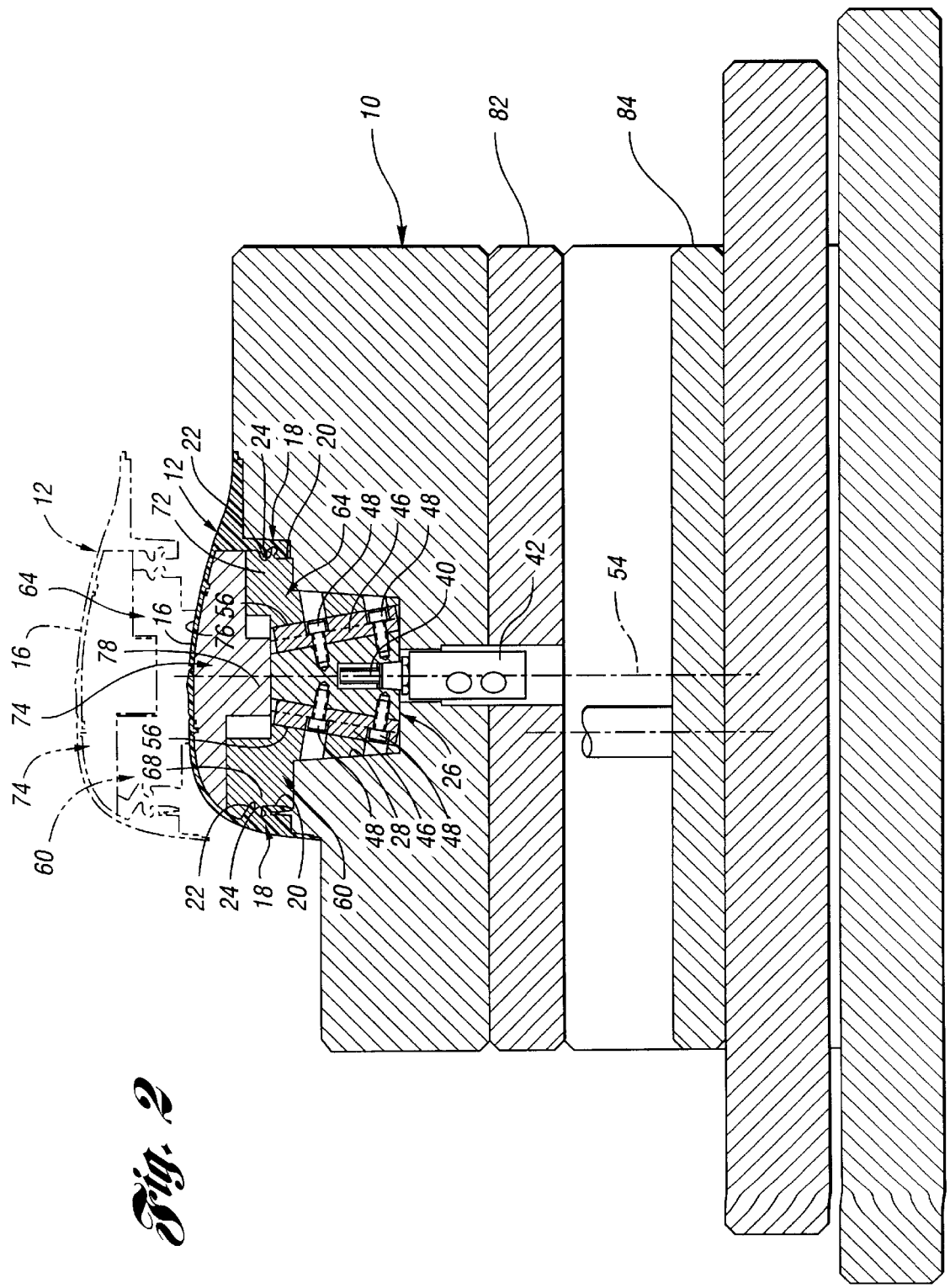
FIG. 2 is a sectional view taken along the lines 2—2 in FIG. 1 with the air bag cover of FIG. 1 snapped-off of mold parts of the injection molding apparatus illustrated in phantom.
Figure 5:
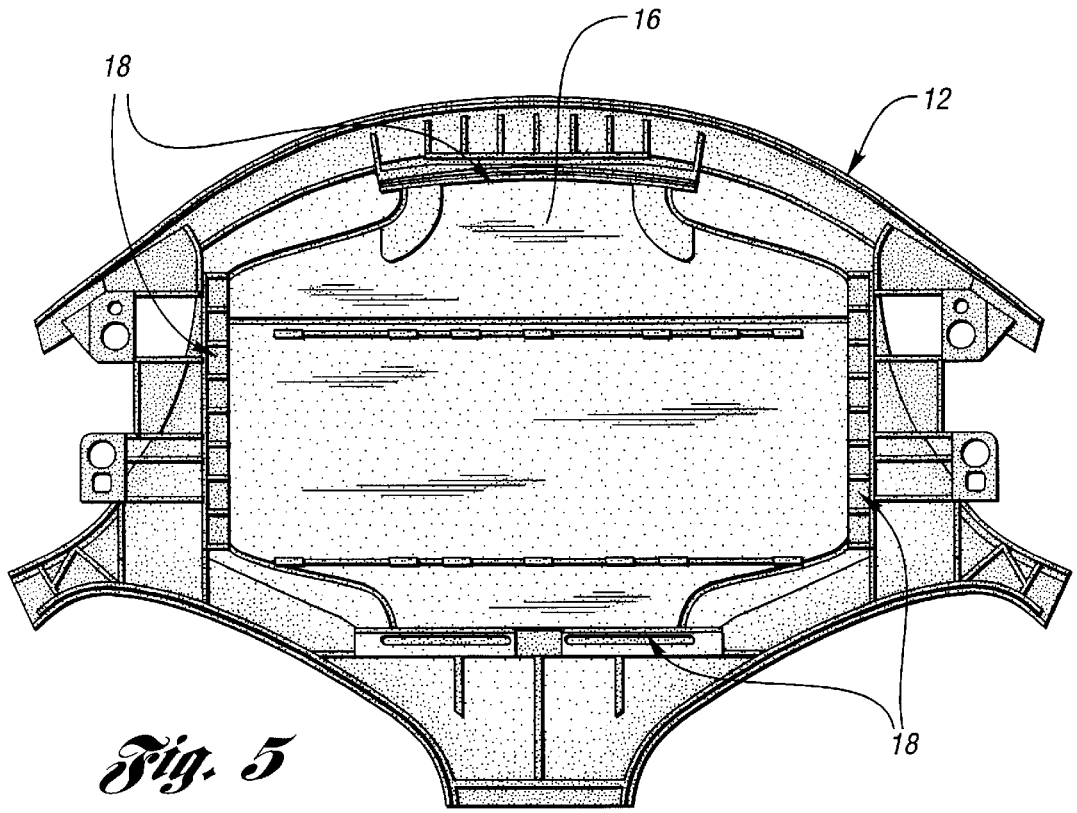
FIG. 5 is a rear elevational view of a thermoplastic air bag cover formed by the injection molding apparatus of the present invention.
Figure 6:
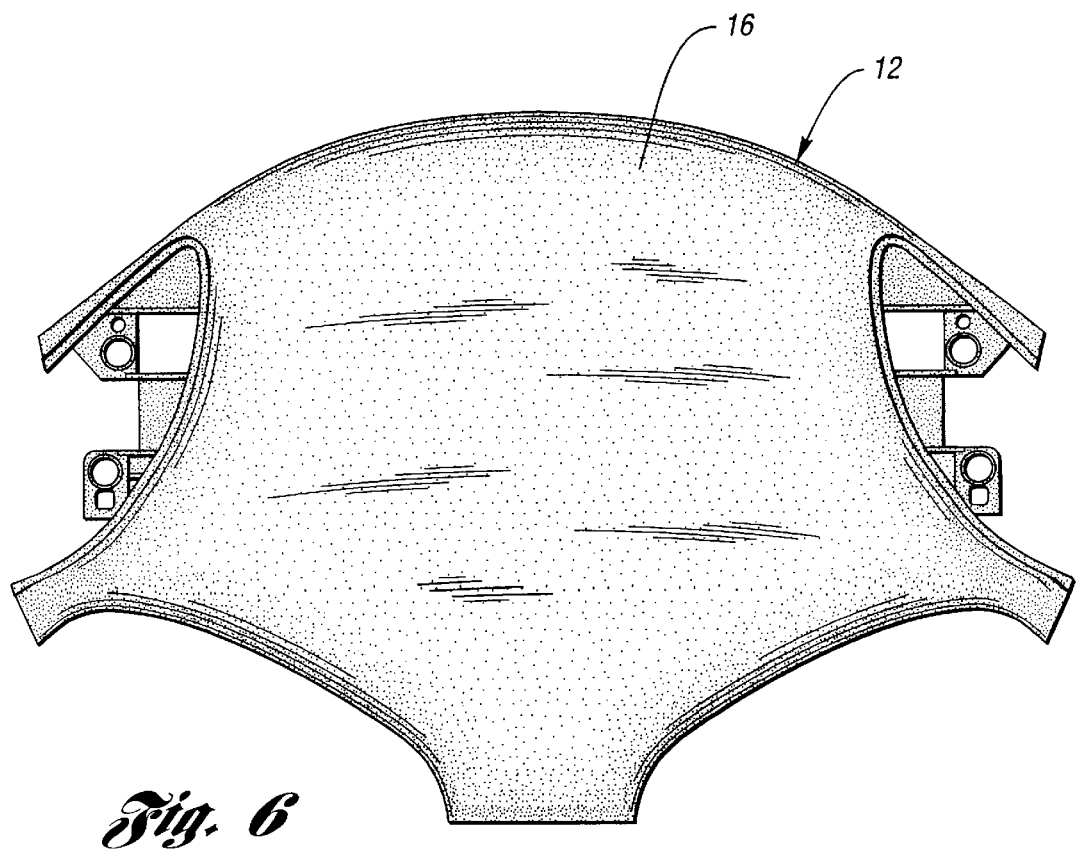
FIG. 6 is a front elevational view of the thermoplastic air bag cover of FIG. 5.

The air bag cover 12 includes a front cover panel 16 and separate resilient clip members, generally indicated at 18 in FIGS. 2, 3 and 5. Each resilient clip member has a front engagement section 20, a rear shoulder section 22, and a snap-on groove 24 extending therebetween for snapping the air bag cover 12 onto a retaining member of an air bag assembly (not shown), as is generally understood in the art.

Referring specifically now to FIGS. 2-4, the injection molding apparatus includes a central wedge, generally indicated at 26, which is positioned within a recess 28 formed in the lower mold half 10. The central wedge 26 is secured within the recess 28 by bolts, one of which is illustrated in phantom at 30 in FIG. 3, which extend through threaded holes extending from a lower surface of the central wedge 26 to secure the central wedge 26 within the recess 28. Dowels, one of which is illustrated in phantom at 34 in FIG. 3, extend into holes 36 also formed in the lower surface of the central wedge 26 to accurately position the center wedge 26 within the recess 28.

A central threaded hole 38 is also formed in the central wedge 26 to receive and retain a spout member 40 therein. The spout member 40 allows cooling water to cool the various mold parts in the second mold half 10 during use of the injection molding apparatus. The spout member 40 is fluidly coupled to a water junction 42 which, in turn, is fluidly coupled to water tubes 44 which extend into the lower mold half 10 to provide the cooling water.

A plurality of bearing members in a form of gibs 46 are removably mounted, such as by bolts 48, at outer inclined surfaces 50 of the center wedge 26. The bolts 48 extend through the gibs 46 and are secured within threaded holes 52 formed through the inclined surfaces 50 of the center wedge 26. In this way, the gibs 46 are also disposed within the recess 28 in the lower mold half 10 and are arranged about a central axis 54 within the second mold half 10. Each of the gibs 46 has a bearing surface 56 which is inclined toward the central axis 54 at a predetermined angle as illustrated in FIGS. 2 and 3.

Outboard, wedge-shaped, mold parts such as outboard wedges, generally indicated at 58, 60, 62 and 64 in FIGS. 1, 2 and 3, are slidably mounted on the bearing surfaces 56 about the central axis 54 for sliding movement relative thereto between retracted positions, as illustrated by the solid lines of FIGS. 2 and 3, within the second mold half 10, and fully extended positions, as illustrated by phantom lines in FIGS. 2 and 3. Each of the outboard mold parts 58 through 64 has a clip member-defining surface 66, 68, 70 and 72, respectively, for forming the front and rear sections 20 and 22, respectively, and the snap-on groove 24 of its corresponding clip member 18. In their retracted positions, the wedges 58–64 together with the gibs 46 and the center wedge 26 are nested in the recess 28 of the second mold half 10.

The injection molding apparatus also includes a central mold part, generally indicated at 74 in FIGS. 2 and 3, which has a front cover panel-defining surface 76 for forming the front cover panel 16 in conjunction with the first mold half 14. The central mold part 74 includes a center portion 78 disposed on the central axis 54 between the outboard mold parts 58, 60, 62 and 64. The outboard mold parts 58–64 move radially inwardly toward the center portion 78 during movement from their retracted positions, as illustrated by the solid lines of FIGS. 2 and 3, toward their fully extended positions as illustrated by the phantom lines in FIGS. 2 and 3.

Means or a mechanism in the form of rods (only two of which are illustrated in phantom at 80 in FIG. 1) are provided for lifting or moving the outboard mold parts 58, 60, 62 and 64, as well as the central mold part 74 in unison upon relative movement of one plate 82 of the lower mold half 10 toward another plate 84 of the lower mold half 10. Movement of the plates 82 and 84 toward each other result in movement of the outboard mold parts 58, 60, 62 and 64 axially and radially inwardly toward the central axis 54 from their retracted positions, as shown by solid lines in FIGS. 2 and 3 to their fully extended positions, shown by phantom lines in FIGS. 2 and 3, to snap the clip members 18 of the air bag cover 12 off their corresponding outboard mold parts 58, 60, 62 and 64.

The central mold part 76 moves in unison with the outboard mold parts 58, 60, 62 and 64 during movement of the plates 82 and 84 toward each other so that the central mold part 74 moves axially along the axis 54 away from the center wedge 26 during movement of the outboard mold parts 58, 60, 62 and 64 radially inwardly toward the central axis 54.

While the best mode for carrying out the invention has been described in detail, those familiar with the art to which this invention relates will recognize various alternative designs and embodiments for practicing the invention as defined by the following claims.

What is claimed is:

1. An injection molding apparatus for molding thermoplastic air bag covers including a first mold half having a first molding surface to form a first part of an air bag cover-defining cavity and a second mold half having a second molding surface to form a second complementary part of the air bag cover-defining cavity, the first and second molding surfaces forming an air bag cover including a front cover panel and separate resilient clip members integrally formed with the front cover panel, each of the clip members having a front section, a rear section and a snap-on groove extending therebetween for snapping the air bag cover into a retaining member of an air bag assembly, wherein the second mold half comprises:

a plurality of bearing members arranged about a central axis of the second mold half, each of the bearing members having a bearing surface inclined towards the central axis at a predetermined angle; and outboard mold parts slidably mounted on the bearing surfaces about the central axis for sliding movement relative thereto between retracted positions and fully extended positions, each of the outboard mold parts having a clip member-defining surface for forming the front and rear sections and the snap-on groove of its corresponding clip member; wherein the outboard mold parts are movable both axially and radially inwardly toward the central axis from their retracted positions to their fully extended positions to snap each of the clip members off its corresponding outboard mold part wherein each outboard mold part is in sliding contact with its respective bearing surface during its entire sliding movement between its retracted and fully extended positions.

2. The apparatus as claimed in claim 1 wherein the second mold half further comprises a central wedge positioned along the central axis and wherein the bearing members comprise gibs removably mounted on the central wedge at peripherally spaced positions thereon and wherein each outboard mold part is in sliding contact with its respective gib during the entire sliding movement of the outboard mold part between its retracted and fully extended positions.

3. The apparatus as claimed in claim 1 wherein the second mold half further comprises a central mold part positioned along the central axis and having a front cover panel-defining surface for forming the front cover panel, and wherein the central mold part is axially movable in unison with movement of the outboard mold parts, the outboard mold parts moving radially inwardly towards the central axis.

4. The apparatus as claimed in claim 1 wherein one of the sections of the clip members is hook-shaped.

5. The apparatus as claimed in claim 3 further comprising rods, each of the rods being coupled to a respective one of the mold parts.

6. The apparatus as claimed in claim 2 wherein each of the outboard mold parts is wedge-shaped.

7. The apparatus as claimed in claim 3 wherein the central mold part includes a center portion disposed between the outboard mold parts, the outboard mold parts moving radially inwardly toward the center portion during movement from the retracted positions toward the fully extended positions of the outboard mold parts.

8. The apparatus as claimed in claim 1 wherein four bearing members and four outboard mold parts are arranged about the central axis to form four clip members.

9. An injection molding apparatus for molding thermoplastic air bag covers including a first mold half having a first molding surface to form a first part of an air bag cover-defining cavity and a second mold half having a second molding surface to form a second complementary part of the air bag cover-defining cavity, the first and second molding surfaces forming an air bag cover including a front cover panel and separate resilient clip members integrally formed with the front cover panel, each of the clip members having a front section, a rear section and a snap-on groove extending therebetween for snapping the air bag cover onto a retaining member of an air bag assembly, wherein the second mold half comprises:

a plurality of gibs arranged about a central axis of the second mold half, each of the gibs having a bearing surface inclined towards the central axis at a predetermined angle;

wedge-shaped, outboard mold parts slidably mounted on the bearing surfaces of the gibs about the central axis for sliding movement relative thereto between retracted positions and fully extended positions, each of the outboard mold parts having a clip member defining surface for forming the front and rear sections and the snap-on groove of its corresponding clip member; and rods coupled to their respective outboard mold parts for slidably moving the outboard mold parts axially and radially inwardly toward the central axis from their retracted positions to their fully extended positions to snap each of the clip members off its corresponding outboard mold part wherein each outboard mold part is in sliding contact with its respective bearing surface during its entire sliding movement between its respective and fully extended positions.

10. An injection molding apparatus for molding thermoplastic air bag covers including a first mold half having a first molding surface to form a first part of an air bag cover-defining cavity and a second mold half having a second molding surface to form a second complementary part of the air bag cover-defining cavity, the first and second molding surfaces forming an air bag cover including a front cover panel and separate resilient clip members integrally formed with the front cover panel, each of the clip members having a front section, a rear section and a snap-on groove extending therebetween for snapping the air bag cover onto a retaining member of an air bag assembly, wherein the second mold half comprises:

a central wedge positioned along a central axis;

a plurality of bearing members removably mounted on the central wedge at peripherally spaced positions thereon, each of the bearing members having a bearing surface inclined towards the central axis at a predetermined angle;

outboard mold parts slidably mounted on the bearing surfaces about the central axis for sliding movement relative thereto between retracted positions wherein the central wedge, the bearing members, and the outboard mold parts are nested together and fully extended positions, each of the outboard mold parts having a clip member-defining surface for forming the front and rear sections and the snap-on groove of its corresponding clip member; and a central mold part positioned along the central axis between the outboard mold parts and having a front cover panel-defining surface for forming the front cover panel; wherein the outboard mold parts are movable both axially and radially inwardly toward the central axis from their retracted positions to their fully extended positions to snap each of the clip members off its corresponding outboard mold part; and wherein the central mold part is movable in unison with movement of the outboard mold parts wherein each outboard mold part is in sliding contact with its respective bearing surface during its entire sliding movement between its retracted and fully extended positions.

* * * * *